US010380049B2

(12) United States Patent
Lin et al.

(10) Patent No.: US 10,380,049 B2
(45) Date of Patent: Aug. 13, 2019

(54) MULTI-HOST SUPPORTED UNIVERSAL SERIAL BUS HUB AND AUTOMOBILE HEAD UNIT USING THE SAME

(71) Applicant: Jumplux Technology Co., Ltd, Hsinchu (TW)

(72) Inventors: Hong-Chi Lin, Hsinchu (TW); Kuo-Feng Tseng, Hsinchu (TW)

(73) Assignee: Jumplux Technology Co., Ltd., Hsinchu Science Park (TW)

( * ) Notice: Subject to any disclaimer, the term of this patent is extended or adjusted under 35 U.S.C. 154(b) by 81 days.

(21) Appl. No.: 15/496,645

(22) Filed: Apr. 25, 2017

(65) Prior Publication Data

US 2017/0329733 A1    Nov. 16, 2017

Related U.S. Application Data

(60) Provisional application No. 62/335,733, filed on May 13, 2016.

(51) Int. Cl.
*G06F 13/38* (2006.01)
*G06F 13/42* (2006.01)
*G06F 13/40* (2006.01)

(52) U.S. Cl.
CPC ........ *G06F 13/385* (2013.01); *G06F 13/4068* (2013.01); *G06F 13/4282* (2013.01); *G06F 2213/0042* (2013.01); *G06F 2213/3812* (2013.01); *G06F 2213/4004* (2013.01)

(58) Field of Classification Search
None
See application file for complete search history.

(56) References Cited

U.S. PATENT DOCUMENTS

| | | | | |
|---|---|---|---|---|
| 7,152,190 | B2 * | 12/2006 | Overtoom | G06F 11/3648 714/44 |
| 8,447,890 | B1 * | 5/2013 | LeTourneur | G06F 13/4022 710/305 |
| 10,162,788 | B2 * | 12/2018 | Shetty | G06F 13/4282 |
| 2003/0167345 | A1 * | 9/2003 | Knight | B60R 16/0315 709/249 |
| 2004/0019732 | A1 * | 1/2004 | Overtoom | G06F 13/4022 710/313 |
| 2006/0106962 | A1 * | 5/2006 | Woodbridge | G06F 13/4291 710/106 |
| 2006/0195625 | A1 * | 8/2006 | Hesse | G06F 13/385 710/8 |
| 2010/0036992 | A1 * | 2/2010 | Sisto | G06F 13/387 710/305 |

(Continued)

*Primary Examiner* — Michael Sun
(74) *Attorney, Agent, or Firm* — Muncy, Geissler, Olds & Lowe, P.C.

(57) ABSTRACT

A universal serial bus (USB) hub supporting multiple hosts and an automobile head unit using the same are provided. A USB hub circuit is set in the USB hub, which is coupled to external connectors through a bus matrix. Herein, an upstream port connector of the USB hub is coupled to the automobile head unit. When one device is coupled to a downstream port requests to serve as a host, the bus matrix couples the downstream port, coupled to the requesting device, to an upstream port of the USB hub circuit, and couples the downstream port to the automobile head unit to make the automobile head unit serve as the device.

13 Claims, 6 Drawing Sheets

(56) References Cited

U.S. PATENT DOCUMENTS

| | | | |
|---|---|---|---|
| 2012/0166582 A1* | 6/2012 | Binder | H04L 63/18 709/217 |
| 2015/0089092 A1* | 3/2015 | Voto | G06F 13/4282 710/14 |
| 2016/0371206 A1* | 12/2016 | Maung | G06F 13/20 |
| 2018/0052799 A1* | 2/2018 | Shetty | G06F 13/4282 |

* cited by examiner

MULTI-HOST SUPPORTED UNIVERSAL SERIAL BUS HUB AND AUTOMOBILE HEAD UNIT USING THE SAME

This application claims priority to U.S. Provisional Patent Application Ser. No. 62/325,733 filed on May 13, 2016 which is incorporated herein by reference in its entirety.

BACKGROUND OF THE INVENTION

Field of the Invention

The present invention relates to the technology of a universal serial bus (USB), and more particularly to a multi-host supported USB hub and an automobile head unit using the same.

Description of the Related Art

The universal serial bus (USB) has the relatively wide applications. At present, application devices each equipped with the USB may be classified into five categories comprising: a personal computer (PC), such as a desktop computer and a mobile computer; a personal computer peripheral, such as a multi-function peripheral, an external hard drive, a keyboard or a speaker; consumer electronics, such as a television, a digital camera, a playstation or a DVD player; and mobile communication, such as a mobile phone or a modem; and automobile electronics.

Figure 1:
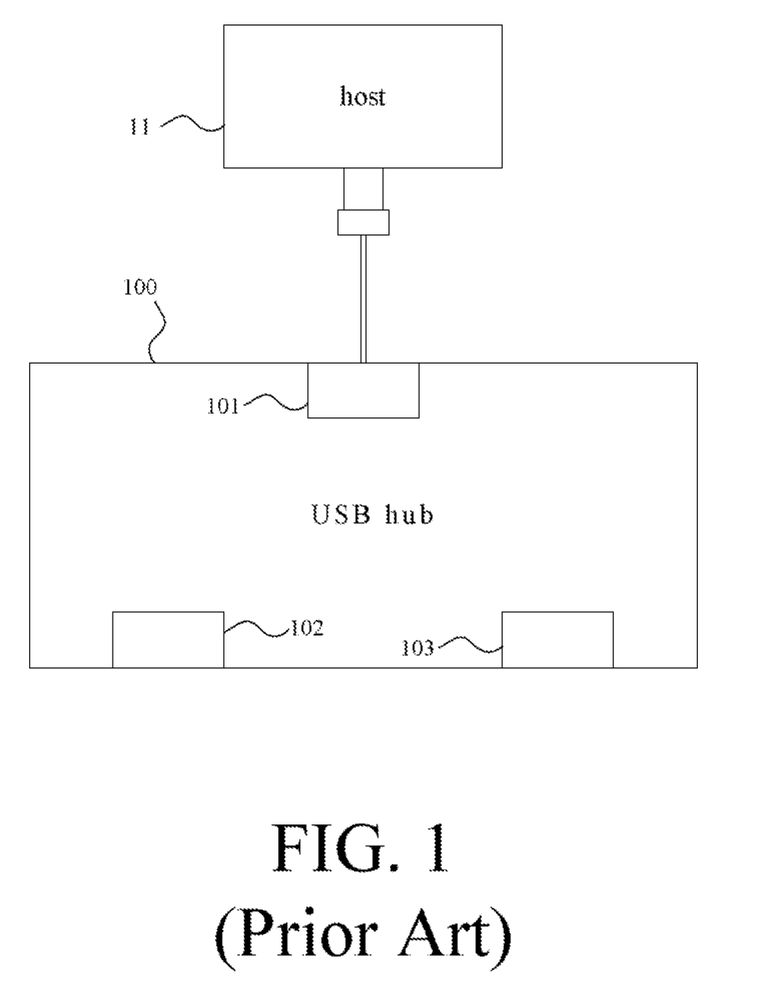
FIG. 1 is a block diagram showing a conventional USB hub.

With the rapid development of the electronic technology and its wide application in the automobile industry, the automobile device system is being developed in the intelligent, informationization and networking directions. The USB hub of the automobile plays a role of expanding functions. An ordinary USB hub is shown in FIG. 1. FIG. 1 is a block diagram showing a conventional USB hub. Referring to FIG. 1, an ordinary USB hub 100 has an upstream port 101 and two downstream ports 102 and 103. The upstream port 101 connects the USB hub 100 to a host 11. The remaining peripheral elements may be mounted to the downstream port 102 or 103. In the ordinary transmission, the data received from the upstream port 101 is broadcasted to each of the peripheral elements mounted to the downstream ports 102 and 103. The data received from the downstream port 102 or 103 is only forwarded to the upstream port 101. In other words, the data outputted from the host 11 is received by all the connected peripherals, but the data outputted from the peripheral is only received by the host 11.

Generally speaking, if the USB hub 100 of FIG. 1 is applied to the automobile head unit, the upstream port 101 would be connected to the automobile head unit. However, more and more devices each having the USB have the abilities of serving as hosts, and there are more and more applications in this field, such as the car intelligent system (CarPlay technology) of Apple Inc. The vehicle control system supporting the CarPlay car intelligent system usually serves as the host. However, when being connected to the mobile device of Apple Inc., the vehicle control system supporting the CarPlay car intelligent system must have the ability of serving as the ordinary USB device.

Thus, a universal serial bus hub design capable of changing the upstream port and downstream port is needed.

SUMMARY OF THE INVENTION

An objective of the present invention is to provide a multi-host supported USB hub and an automobile head unit using the same, wherein an external device originally connected to the automobile head unit can switch its identity from a USB device to a host.

In view of this, the present invention provides a multi-host supported USB hub. The multi-host supported USB hub comprises an upstream port connector, a first downstream port connector, a second downstream port connector, a USB hub circuit, a first USB device controller and a first USB OTG controller. The USB hub circuit comprises an upstream port, a first downstream port and a second downstream port. The first USB device controller is coupled to the first downstream port and for simulating a USB device. The first USB OTG controller is coupled to the first downstream port connector and the first USB device controller. When the first downstream port connector is connected to a first OTG host device, the first OTG host device identifies a device, connected to the upstream port connector, as a USB device through the first USB OTG controller and the first USB device controller, and the device, connected to the upstream port connector, identifies the first OTG host device, connected to the first downstream port connector, as a USB device through the first USB OTG controller and the first USB device controller.

The present invention additionally provides an automobile head unit. The automobile head unit comprises a car stereo and the multi-host supported USB hub of the present invention. The multi-host supported USB hub comprises an upstream port connector, a first downstream port connector, a second downstream port connector, a USB hub circuit, a first USB device controller and a first USB OTG controller. The USB hub circuit comprises an upstream port, a first downstream port and a second downstream port. The first USB device controller is coupled to the first downstream port and for simulating a USB device. The first USB OTG controller is coupled to the first downstream port connector and the first USB device controller. When the first downstream port connector is connected to a first OTG host device, the first OTG host device identifies a device, connected to the upstream port connector, as a USB device through the first USB OTG controller and the first USB device controller. The device, connected to the upstream port connector, identifies the first OTG host device, connected to the first downstream port connector, as a USB device through the first USB OTG controller and the first USB device controller.

In the multi-host supported USB hub and the automobile head unit using the same according to the preferred embodiment of the present invention, the above-mentioned multi-host supported USB hub further comprises a second USB device controller and a second USB OTG controller. The second USB device controller is coupled to the second downstream port and for simulating a USB device. The second USB OTG controller is coupled to the second downstream port connector and the second USB device controller. When the second downstream port connector is connected to a second OTG host device, the second OTG host device identifies the device, connected to the upstream port connector, as a USB device through the second USB OTG controller and the second USB device controller, and the device, connected to the upstream port connector, identifies the second OTG host device, connected to the first downstream port connector, as a USB device through the second USB OTG controller and the second USB device controller.

In the multi-host supported USB hub and the automobile head unit using the same according to the preferred embodiment of the present invention, the above-mentioned multi-host supported USB hub further comprises a bus matrix. The bus matrix comprises a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first USB device controller, and the sixth input-output port is coupled to the second downstream port connector, wherein connection relationships from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be connected to the upstream port of the USB hub circuit.

In the multi-host supported USB hub and the automobile head unit using the same according to the preferred embodiment of the present invention, the above-mentioned multi-host supported USB hub further comprises a first multiplexer. The first multiplexer comprises a first port, a second port and a third port, wherein the first port of the first multiplexer is coupled to the first downstream port connector, the second port of the first multiplexer is coupled to the fifth input-output port of the bus matrix, and the third port of the first multiplexer is coupled to the first USB OTG controller, wherein the first multiplexer decides that the first port is electrically connected to the second port or the third port. In another preferred embodiment, the above-mentioned multi-host supported USB hub further comprises a second multiplexer. The second multiplexer comprises a first port, a second port and a third port, wherein the first port of the second multiplexer is coupled to the second downstream port connector, the second port of the second multiplexer is coupled to the sixth input-output port of the bus matrix, and the third port of the second multiplexer is coupled to the second USB OTG controller, wherein the second multiplexer decides that the first port is electrically connected to the second port or the third port.

The present invention additionally provides a multi-host supported USB hub. The multi-host supported USB hub comprises an upstream port connector, a first downstream port connector, a second downstream port connector, a USB hub circuit and a bus matrix. The USB hub circuit comprises an upstream port, a first downstream port and a second downstream port. The bus matrix comprises a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first downstream port connector, the sixth input-output port is coupled to the second downstream port connector. Connection relationships, from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be connected to the upstream port of the USB hub circuit.

The present invention additionally provides an automobile head unit. The automobile head unit comprises a car stereo and the multi-host supported USB hub of the present invention. The multi-host supported USB hub comprises an upstream port connector, a first downstream port connector, a second downstream port connector, a USB hub circuit and a bus matrix. The USB hub circuit comprises an upstream port, a first downstream port and a second downstream port. The bus matrix comprises a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first downstream port connector, the sixth input-output port is coupled to the second downstream port connector. Connection relationships, from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be connected to the upstream port of the USB hub circuit.

In the multi-host supported USB hub and the automobile head unit using the same according to the preferred embodiment of the present invention, the above-mentioned multi-host supported USB hub further comprises a first USB device controller and a first USB OTG controller. The first USB device controller is coupled to the fifth input-output port of the bus matrix and for simulating a USB device. The first USB OTG controller is coupled to the first downstream port connector and the first USB device controller. When the first downstream port connector is connected to the first OTG host device, the first OTG host device identifies a device, connected to the upstream port connector, as a USB device through the first USB OTG controller and the first USB device controller, and the device, connected to the upstream port connector, identifies the first OTG host device, connected to the first downstream port connector, as a USB device through the first USB OTG controller and the first USB device controller.

In the multi-host supported USB hub and the automobile head unit using the same according to the preferred embodiment of the present invention, the above-mentioned multi-host supported USB hub further comprises a second USB device controller and a second USB OTG controller. The second USB device controller is coupled to the second downstream port and for simulating a USB device. The second USB OTG controller is coupled to the second downstream port connector and the second USB device controller. When the second downstream port connector is connected to a second OTG host device, the second OTG host device identifies the device, connected to the upstream port connector, as a USB device through the second USB OTG controller and the second USB device controller, and the device, connected to the upstream port connector, identifies the second OTG host device, connected to the first downstream port connector, as a USB device through the second USB OTG controller and the second USB device controller.

In the multi-host supported USB hub and the automobile head unit using the same according to the preferred embodiment of the present invention, the above-mentioned multi-host supported USB hub further comprises a first multiplexer. The first multiplexer comprises a first port, a second port and a third port, wherein the first port of the first multiplexer is coupled to the first downstream port connector, the second port of the first multiplexer is coupled to the fifth input-output port of the bus matrix, and the third port of the first multiplexer is coupled to the first USB OTG controller, wherein the first multiplexer decides that the first port is electrically connected to the second port or the third port. In another preferred embodiment, the above-mentioned multi-host supported USB hub further comprises a second multiplexer. The second multiplexer comprises a first port, a second port and a third port, wherein the first port of the second multiplexer is coupled to the second downstream port connector, the second port of the second multiplexer is coupled to the sixth input-output port of the bus matrix, and the third port of the second multiplexer is coupled to the second USB OTG controller, wherein the second multiplexer decides that the first port is electrically connected to the second port or the third port.

The essence of the present invention is based on the bus matrix. If the device, which is coupled to the downstream port connector, transmits a request to serve as the host, then the bus matrix switches the device, which is coupled to the downstream port connector, to be coupled to the upstream port, and the bus matrix switches the original automobile head unit to be coupled to the downstream port. In another embodiment, the downstream port connector is coupled to the USB OTG controller, and the USB OTG controller is coupled to the USB device controller. In addition, the USB device controller is coupled to the downstream port. If the device, which is coupled to the downstream port connector, requests to serve as the host, then the device, which is coupled to the downstream port connector, identifies the automobile head unit as a USB device through the USB OTG controller and the USB device controller.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 2:
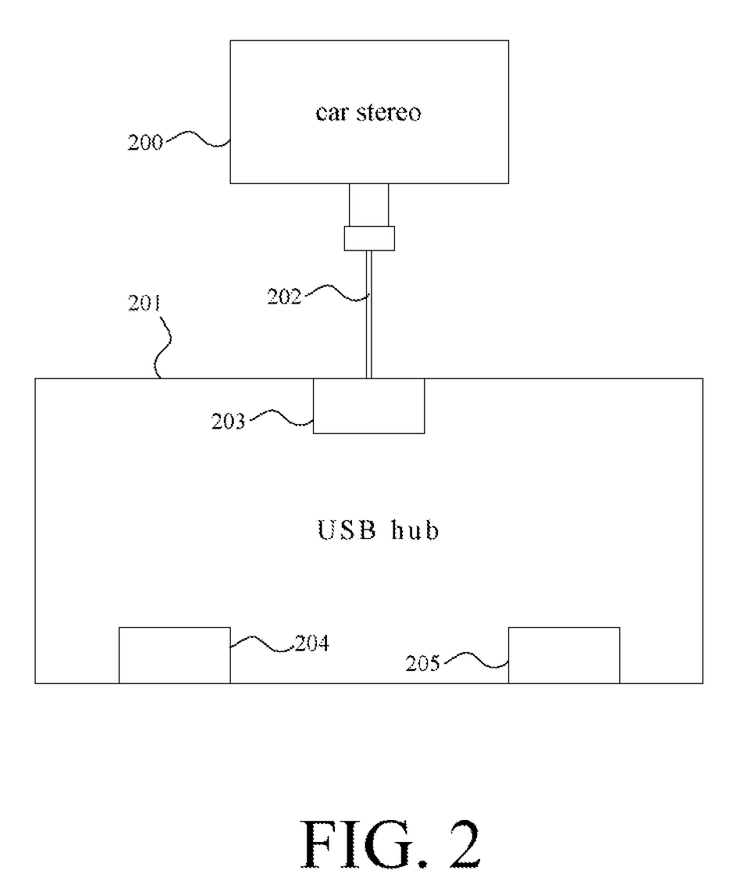
FIG. 2 is a system block diagram showing an automobile head unit according to a preferred embodiment of the present invention.

FIG. 2 is a system block diagram showing an automobile head unit according to a preferred embodiment of the present invention. Referring to FIG. 2, the automobile head unit comprises a car stereo 200 and a multi-host supported USB hub 201 according to the embodiment of the present invention. The multi-host supported USB hub 201 comprises an upstream port connector 203, a first downstream port connector 204 and a second downstream port connector 205. The car stereo 200 is coupled to the upstream port connector 203 of the multi-host supported USB hub 201 through a USB 202. Generally speaking, the car stereo 200 serves as a host. The first downstream port connector 204 and the second downstream port connector 205 are connected to USB devices, respectively, to perform the expanded functions. Similar to the CarPlay or other technology, the technology of switching the device, connected to the USB, to the host. The operation of the multi-host supported USB hub 201 according to the preferred embodiment of the present invention will be described in the following.

Figure 3:
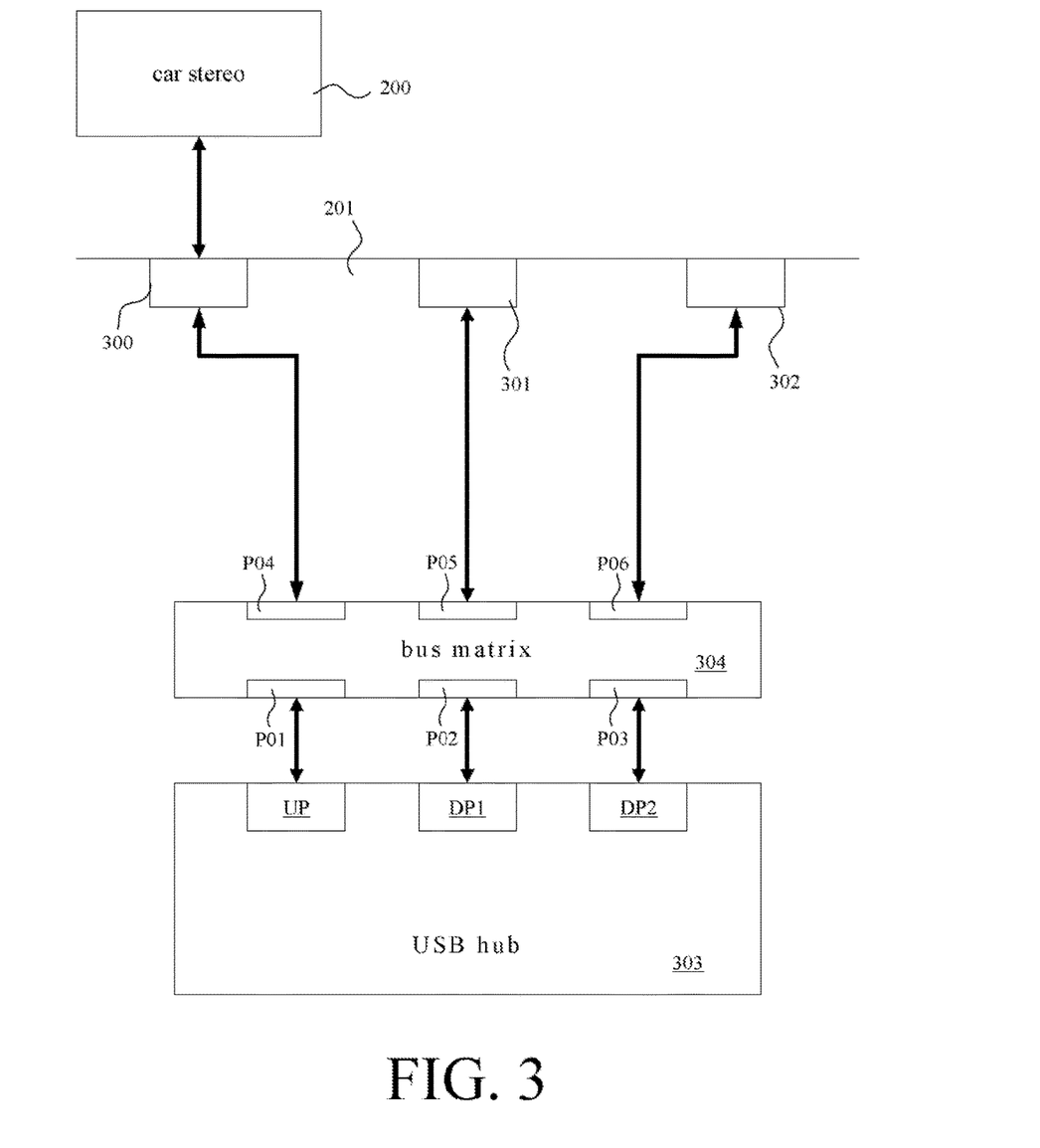
FIG. 3 is a system block diagram showing a multi-host supported USB hub 201 according to a preferred embodiment of the present invention.

FIG. 3 is a system block diagram showing a multi-host supported USB hub 201 according to a preferred embodiment of the present invention. Referring to FIG. 3, the multi-host supported USB hub 201 comprises an upstream port connector 300, a first downstream port connector 301, a second downstream port connector 302, a USB hub circuit 303 and a bus matrix 304. The coupling relationships thereof are shown in FIG. 3. The USB hub circuit 303 comprises an upstream port UP, a first downstream port DP1 and a second downstream port DP2. The bus matrix 304 comprises a first input-output port P01, a second input-output port P02, a third input-output port P03, a fourth input-output port P04, a fifth input-output port P05 and a sixth input-output port P06.

The upstream port UP is coupled to the car stereo 200. In an ordinary condition, the car stereo 200 is the host, so the first input-output port P01 of the bus matrix 304 is coupled to the fourth input-output port P04 of the bus matrix 304, the second input-output port P02 of the bus matrix 304 is coupled to the fifth input-output port P05 of the bus matrix 304, and the third input-output port P03 of the bus matrix 304 is coupled to the sixth input-output port P06 of the bus matrix 304. At this time, it is assumed that the first downstream port connector 301 is connected to a smart phone and requests to serve as a host, then the bus matrix 304 couples the first input-output port P01 to the fifth input-output port P05, and the bus matrix 304 couples the second input-output port P02 to the fourth input-output port P04. At this time, the smart phone is coupled to the upstream port UP of the USB hub circuit 303, and the car stereo 200 is coupled to the first downstream port DP1 of the USB hub circuit 303. At this time, the car stereo 200 serves as a USB device.

The above-mentioned embodiment adopts the master and slave switching method to switch the upstream port UP, coupled to the host, to be coupled to the smart phone, and switch the first downstream port DP1, originally coupled to the USB device, to be coupled to the car stereo 200. Another implementation method will be adopted in the following.

Figure 4:
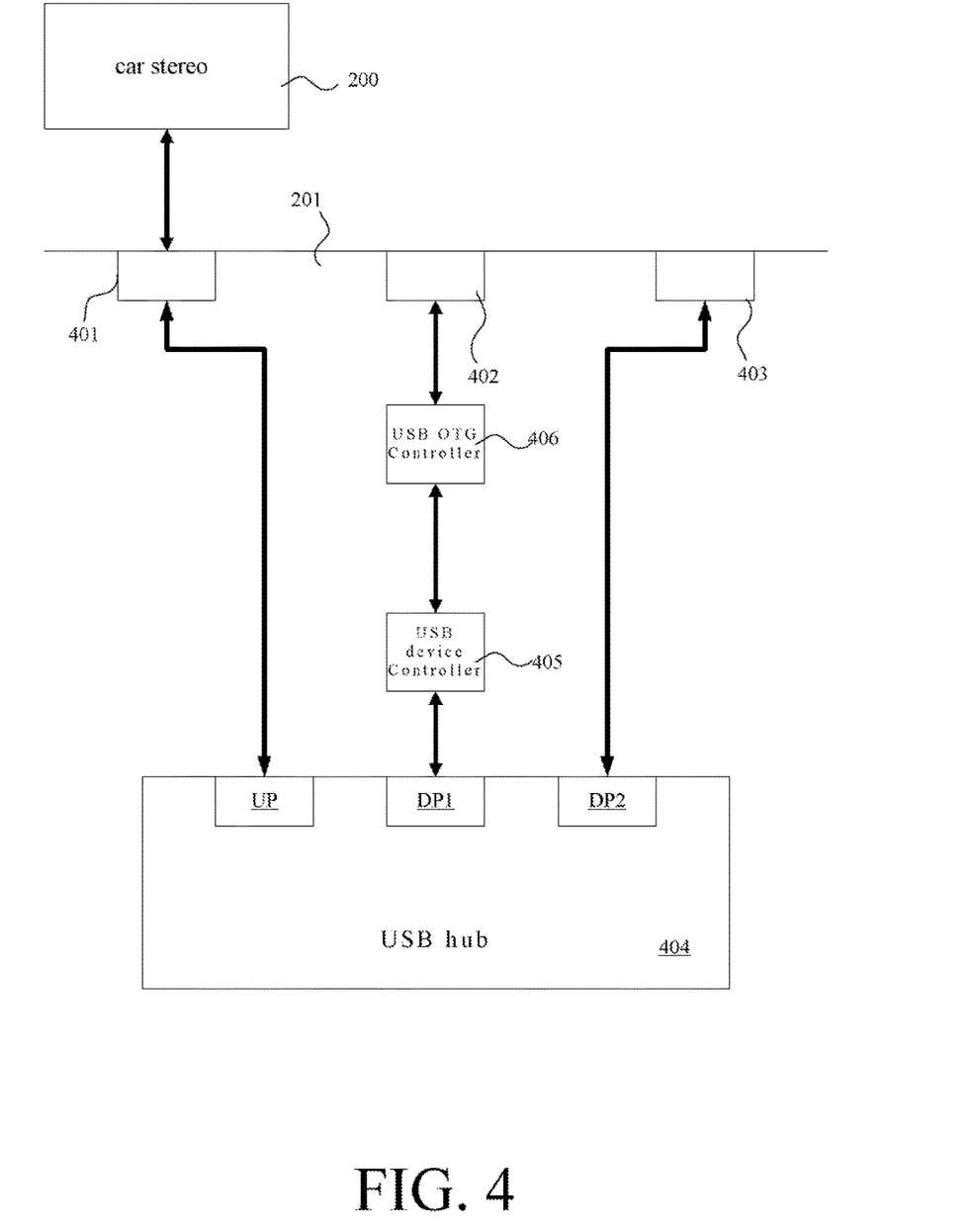
FIG. 4 is a system block diagram showing a multi-host supported USB hub 201 according to a preferred embodiment of the present invention.

FIG. 4 is a system block diagram showing a multi-host supported USB hub 201 according to a preferred embodiment of the present invention. Referring to FIG. 4, the multi-host supported USB hub 201 comprises an upstream port connector 401, a first downstream port connector 402, a second downstream port connector 403, a USB hub circuit 404, a first USB device controller 405 and a first USB On-The-Go (OTG) controller 406. The coupling relationships thereof are as shown in FIG. 4. The USB hub circuit 404 comprises an upstream port UP, a first downstream port DP1 and a second downstream port DP2. The first USB device controller 405 for simulating a USB device is coupled to the first downstream port DP1. The first USB OTG controller 406 is coupled to the first downstream port connector 402 and the first USB device controller 405.

In this embodiment, the first USB OTG controller 406 is used to allow the USB device to serve as a host. Thus, other USB devices may be thereby connected to the above-mentioned device, which is also the USB device. So, the above-mentioned two USB devices can communicate with each other without a host. This USB OTG controller can let the connected USB devices switch between two roles of the host and the device.

In order to implement the OTG function, the USB device must have the ability of serving as the host, and the role of the host is originally provided by a desktop or a notebook computer. In the OTG specification, two communication protocols, the Session Request Protocol (SRP) and the Host Negotiation Protocol (HNP), are proposed. In addition, in the OTG specification, a new USB device is defined, and the USB device has host and peripheral abilities, and is referred to as a dual-role device.

In the HNP, an OTG dual-role device can be operated to serve as a host or a peripheral device. The initial host is referred as, for example, the device A here. The initial peripheral device is referred as the device B here. Once the two devices are connected together, the OTG dual-role device can switch the role between the host and the peripheral device according to the HNP. The SRP allows the above-mentioned device B to send a request to request the device A to turn on the VBUS power. At this time, the sessions of the device A and the device B are established. Thus, the device B can use the HNP.

It is assumed that the first downstream port connector 402 is connected to a smart phone and requests to serve as the host. At this time, because the smart phone is coupled to the first USB OTG controller 406 and the first USB OTG controller 406 is further coupled to the first USB device controller 405, the smart phone identifies the device, to which is coupled, as a USB device. Similarly, the car stereo 200 is coupled to the upstream port UP of the USB hub circuit 404, so the car stereo 200 is still a host. The car stereo 200 also identifies the device, which is coupled to the first downstream port connector 402, as a USB device owing to the first USB device controller 405. So in this embodiment, data is transmitted in a dual-host manner.

Figure 5:
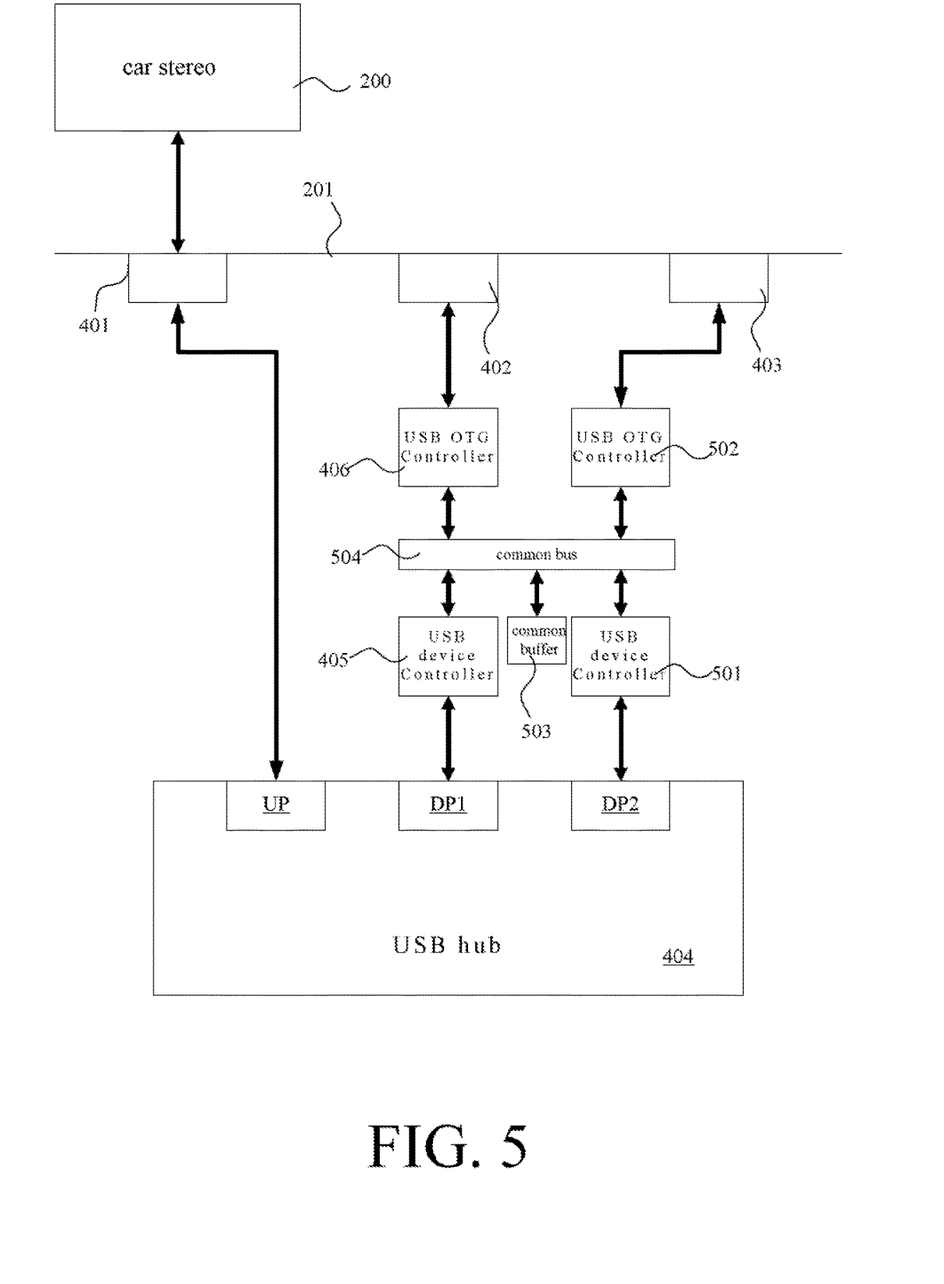
FIG. 5 is a system block diagram showing a multi-host supported USB hub 201 according to a preferred embodiment of the present invention.

FIG. 5 is a system block diagram showing a multi-host supported USB hub 201 according to a preferred embodiment of the present invention. Referring to FIG. 5, the multi-host supported USB hub 201 comprises an upstream port connector 401, a first downstream port connector 402, a second downstream port connector 403, a USB hub circuit 404, a first USB device controller 405, a first USB OTG controller 406, a second USB device controller 501, a second USB OTG controller 502, a common buffer 503 and a common bus 504. The USB hub circuit 404 comprises an upstream port UP, a first downstream port DP1 and a second downstream port DP2. The first USB device controller 405 for simulating a USB device is coupled to the first downstream port DP1. The first USB OTG controller 406 is coupled to the first downstream port connector 402 and the first USB device controller 405. The second USB device controller 501 for simulating a USB device is coupled to the second downstream port DP2. The second USB OTG controller 502 is coupled to the second downstream port connector 403 and the second USB device controller 501.

Similarly, it is assumed that the second downstream port connector 403 is connected to a smart phone and requests to serve as host. At this time, because the smart phone is coupled to the second USB OTG controller 502 and the second USB OTG controller 502 is further coupled to the first USB device controller 501, the smart phone identifies the device, to which is coupled, as a USB device. Similarly, the car stereo 200 is coupled to the upstream port UP of the USB hub circuit 404, so the car stereo 200 is still a host. The car stereo 200 also identifies the device, which is coupled to the second downstream port connector 403, as a USB device owing to the second USB device controller 501. Because the first downstream port connector 402 and the second downstream port connector 403 are coupled to the first USB device controller 405, the first USB OTG controller 406, the second USB device controller 501 and the second USB OTG controller 502, respectively, data can be transmitted in a three-host manner in this embodiment.

In addition, because the data is transmitted by the car stereo 200 by way of broadcasting, each USB device controllers 405 and 501 receives the data transmitted by the car stereo 200. So, these data are firstly stored in the common buffer 503, and then extracted by the corresponding USB OTG controllers 406 and 502. Similarly, if the first USB OTG controller 406 or the second USB OTG controller 502 transmits the data, then the data are also firstly stored in the common buffer 503 through the common bus 504, and then extracted by the corresponding USB device controllers 405 and 501.

Figure 6:
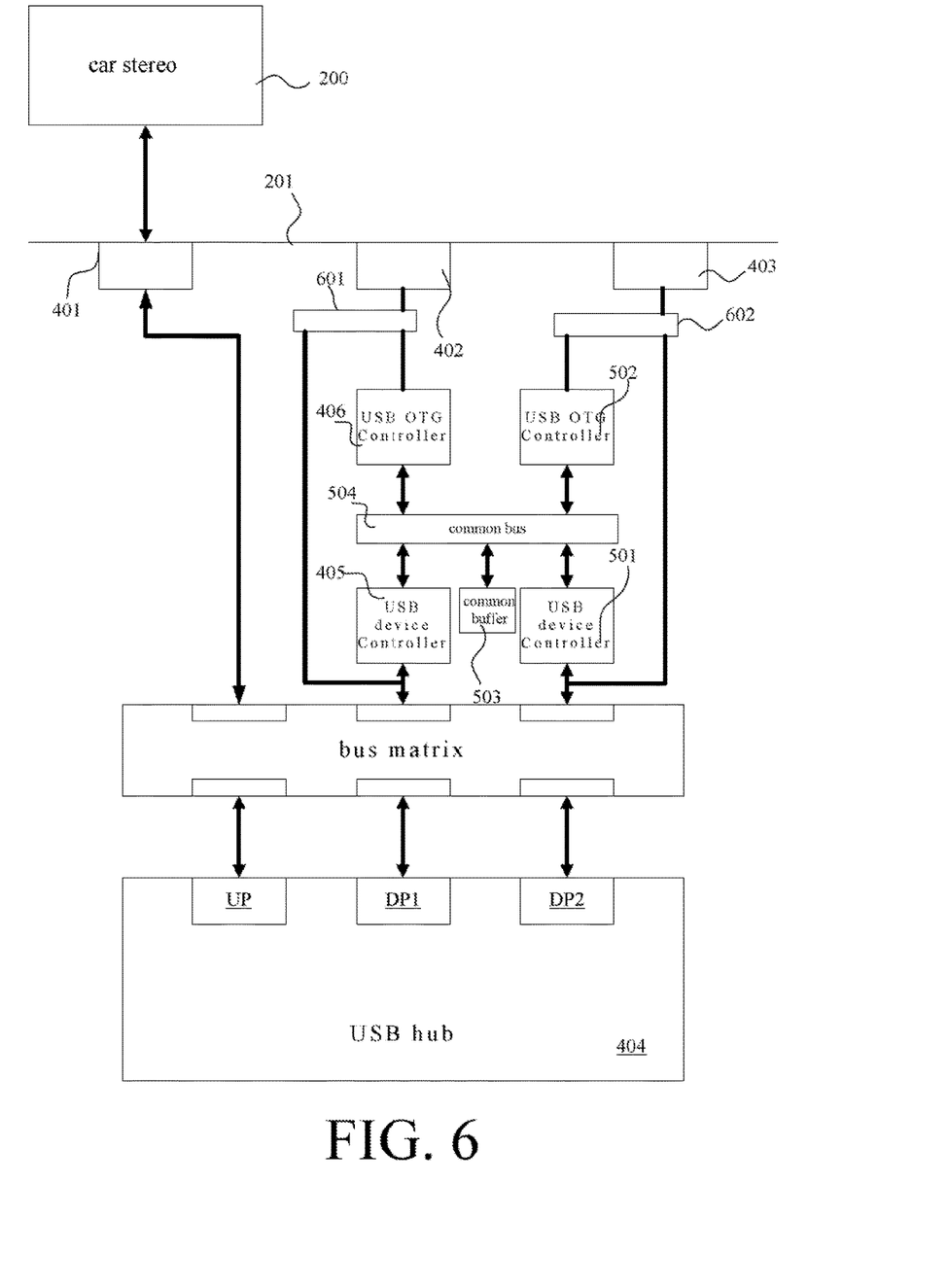
FIG. 6 is a system block diagram showing a multi-host supported USB hub 201 according to a preferred embodiment of the present invention.

FIG. 6 is a system block diagram showing a multi-host supported USB hub 201 according to a preferred embodiment of the present invention. Referring to FIG. 6, the multi-host supported USB hub 201 comprises an upstream port connector 401, a first downstream port connector 402, a second downstream port connector 403, a USB hub circuit 404, a first USB device controller 405, a first USB OTG controller 406, a second USB device controller 501, a second USB OTG controller 502, a common buffer 503, a common bus 504, a bus matrix 304, a first multiplexer 601 and a second multiplexer 602. The coupling relationship thereof is as shown in FIG. 6.

In the embodiment of FIG. 6, the operations of the first USB device controller 405, the first USB OTG controller 406, the second USB device controller 501, the second USB OTG controller 502 and the bus matrix 304 are the same as those of the above-mentioned embodiment. The first multiplexer 601 is used to determine whether the first downstream port connector 402 is coupled to the fifth input-output port P05 of the bus matrix 304 without through the first USB device controller 405 and the first USB OTG controller 406, and the second multiplexer 602 is used to determine whether the second downstream port connector 403 is coupled to the sixth input-output port P06 of the bus matrix 304 without through the second USB device controller 501 and the second USB OTG controller 502.

This design is mainly for the requirements of the downstream manufacturers, where the architecture thereof is changeable. It is assumed that the manufacturer requires the USB hub to only support the single host, but can switch the port position of the host. Before being sold to the manufacturer, it is only necessary to couple the first multiplexer 601 to the fifth input-output port P05 of the bus matrix 304 by way of writing, and couple the second multiplexer 602 to the sixth input-output port P06 of the bus matrix 304 by way of writing. Similarly, if it is assumed that the manufacturer requires the USB hub to support the single-host/dual-host and can switch the port position of the host, then it is only necessary to couple the first multiplexer 601 to the first USB OTG controller 406 by way of writing, and couple the second multiplexer 602 to the sixth input-output port P06 of the bus matrix 304 by way of writing. Therefore, the product of the multi-host supported USB hub 201 may become more flexible.

Although the above-mentioned embodiments are directed to the hub with two downstream port connectors, those skilled in the art should know that the above-mentioned embodiments are only provided for the sake of illustration. Those skilled in the art can modify it into hub with three or more than three downstream port connectors according to the technology of the above-mentioned embodiments. So, the present invention is not restricted thereto.

In summary, the essence of the present invention is based on the bus matrix. If the device, which is coupled to the downstream port connector, transmits a request to serve as the host, then the bus matrix switches the device, which is coupled to the downstream port connector, to be coupled to the upstream port, and the bus matrix switches the original automobile head unit to be coupled to the downstream port. In another embodiment, the downstream port connector is coupled to the USB OTG controller, and the USB OTG controller is coupled to the USB device controller. In addition, the USB device controller is coupled to the downstream port. If the device, which is coupled to the downstream port connector, requests to serve as the host, then the device, which is coupled to the downstream port connector, identifies the automobile head unit as a USB device through the USB OTG controller and the USB device controller.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A multi-host supported USB hub, comprising:
an upstream port connector;
a first downstream port connector;
a second downstream port connector;
a USB hub circuit, comprising:
an upstream port;
a first downstream port; and
a second downstream port; and
a bus matrix comprising a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first downstream port connector, and the sixth input-output port is coupled to the second downstream port connector,
wherein connection relationships from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be coupled to the upstream port of the USB hub circuit,
wherein the multi-host supported USB hub further comprises:
a first USB device controller, which is coupled to the fifth input-output port of the bus matrix and for simulating a USB device; and
a first USB OTG controller coupled to the first downstream port connector and the first USB device controller to allow a device, coupled to the first USB OTG controller, to serve as a host;
wherein when the first downstream port connector is connected to a first OTG host device, the first OTG host device identifies the device, which is connected to the upstream port connector, as a USB device through the first USB OTG controller and the first USB device controller, and the device, which is connected to the upstream port connector, identifies the first OTG host device, which is connected to the first downstream port connector, as a USB device through the first USB OTG controller and the first USB device controller,
wherein the multi-host supported USB hub further comprises:
a second USB device controller, which is coupled to the sixth input-output port of the bus matrix and for simulating a USB device; and
a second USB OTG controller coupled to the second downstream port connector and the second USB device controller,
wherein when the second downstream port connector is connected to a second OTG host device, the second OTG host device identifies the device, which is connected to the upstream port connector, as a USB device through the second USB OTG controller and the second USB device controller, and the device, which is connected to the upstream port connector, identifies the second OTG host device, which is connected to the second downstream port connector, as a USB device through the second USB OTG controller and the second USB device controller,
wherein a device connected on the second downstream port connector or the first downstream port connector can access other USB device attached on the other USB port.

2. The multi-host supported USB hub according to claim 1, further comprising:
a first multiplexer comprising a first port, a second port and a third port, wherein the first port of the first multiplexer is coupled to the first downstream port connector, the second port of the first multiplexer is coupled to the fifth input-output port of the bus matrix, and the third port of the first multiplexer is coupled to the first USB OTG controller, wherein the first multiplexer is used to decide that the first port is electrically connected to the second port or the third port.

3. The multi-host supported USB hub according to claim 1, further comprising:
a second multiplexer comprising a first port, a second port and a third port, wherein the first port of the second multiplexer is coupled to the second downstream port connector, the second port of the second multiplexer is coupled to the sixth input-output port of the bus matrix, and the third port of the second multiplexer is coupled to the second USB OTG controller,
wherein the second multiplexer is used to decide that the first port is electrically connected to the second port or the third port.

4. An automobile head unit, comprising:
a car stereo; and
a multi-host supported USB hub coupled to the car stereo, the multi-host supported USB hub comprising:
an upstream port connector;
a first downstream port connector;
a second downstream port connector; and
a USB hub circuit, comprising:
an upstream port;
a first downstream port; and
a second downstream port; and
a bus matrix comprising a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first downstream port connector, and the sixth input-output port is coupled to the second downstream port connector,
wherein connection relationships from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be coupled to the upstream port of the USB hub circuit, wherein the multi-host supported USB hub further comprises:
a first USB device controller, which is coupled to the fifth input-output port of the bus matrix and for simulating a USB device; and
a first USB OTG controller coupled to the first downstream port connector and the first USB device controller;
wherein when the first downstream port connector is connected to a first OTG host device, the first OTG host device identifies the device, which is connected to the upstream port connector, as a USB device through the first USB OTG controller and the first USB device controller, and the device, which is connected to the upstream port connector, identifies the first OTG host device, which is connected to the first downstream port connector, as a USB device through the first USB OTG controller and the first USB device controller, wherein the multi-host supported USB hub further comprises:

a second USB device controller, which is coupled to the sixth input-output port of the bus matrix and for simulating a USB device; and
a second USB OTG controller coupled to the second downstream port connector and the second USB device controller,
wherein when the second downstream port connector is connected to a second OTG host device, the second OTG host device identifies the device, which is connected to the upstream port connector, as a USB device through the second USB OTG controller and the second USB device controller, and the device, which is connected to the upstream port connector, identifies the second OTG host device, which is connected to the second downstream port connector, as a USB device through the second USB OTG controller and the second USB device controller,
wherein a device connected on the second downstream port connector or the first downstream port connector can access other USB device attached on the other USB port.

5. The automobile head unit according to claim 4, wherein the multi-host supported USB hub further comprises:
a first multiplexer comprising a first port, a second port and a third port, wherein the first port of the first multiplexer is coupled to the first downstream port connector, the second port of the first multiplexer is coupled to the fifth input-output port of the bus matrix, and the third port of the first multiplexer is coupled to the first USB OTG controller,
wherein the first multiplexer is used to decide that the first port is electrically connected to the second port or the third port.

6. The automobile head unit according to claim 4, wherein the multi-host supported USB hub further comprises:
a second multiplexer comprising a first port, a second port and a third port, wherein the first port of the second multiplexer is coupled to the second downstream port connector, the second port of the second multiplexer is coupled to the sixth input-output port of the bus matrix, and the first port of the second multiplexer is coupled to the second USB OTG controller,
wherein the second multiplexer is used to decide that the first port is electrically connected to the second port or the third port.

7. A multi-host supported USB hub, comprising:
an upstream port connector;
a first downstream port connector;
a second downstream port connector;
a USB hub circuit, comprising:
an upstream port;
a first downstream port; and
a second downstream port;
a first USB device controller, which is coupled to the first downstream port and for simulating a USB device; and
a first USB OTG controller coupled to the first downstream port connector and the first USB device controller;
wherein when the first downstream port connector is connected to a first OTG host device, the first OTG host device identifies the device, which is connected to the upstream port connector, as a USB device through the first USB OTG controller and the first USB device controller, and the device, which is connected to the upstream port connector, identifies the first OTG host device, which is connected to the first downstream port connector, as a USB device through the first USB OTG controller and the first USB device controller,
wherein the multi-host supported USB hub further comprises:
a second USB device controller, which is coupled to the second downstream port for simulating a USB device; and
a second USB OTG controller coupled to the second downstream port connector and the second USB device controller,
wherein when the second downstream port connector is connected to a second OTG host device, the second OTG host device identifies the device, which is connected to the upstream port connector, as a USB device through the second USB OTG controller and the second USB device controller, and the device, which is connected to the upstream port connector, identifies the second OTG host device, which is connected to the second downstream port connector, as a USB device through the second USB OTG controller and the second USB device controller,
wherein a device connected on the second downstream port connector or the first downstream port connector can access other USB device attached on the other USB port.

8. The multi-host supported USB hub according to claim 7, further comprising:
a bus matrix comprising a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first USB device controller, and the sixth input-output port is coupled to the second downstream port connector,
wherein connection relationships from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be coupled to the upstream port of the USB hub circuit.

9. The multi-host supported USB hub according to claim 8, further comprising:
a first multiplexer comprising a first port, a second port and a third port, wherein the first port of the first multiplexer is coupled to the first downstream port connector, the second port of the first multiplexer is coupled to the fifth input-output port of the bus matrix, and the third port of the first multiplexer is coupled to the first USB OTG controller,
wherein the first multiplexer is used to decide that the first port is electrically connected to the second port or the third port.

10. An automobile head unit, comprising:
a car stereo; and
a multi-host supported USB hub coupled to the car stereo, the multi-host supported USB hub comprising:
an upstream port connector;
a first downstream port connector;
a second downstream port connector;
a USB hub circuit, comprising:
an upstream port;
a first downstream port; and
a second downstream port;
a first USB device controller, which is coupled to the first downstream port and for simulating a USB device; and
a first USB OTG controller coupled to the first downstream port connector and the first USB device controller;
wherein when the first downstream port connector is connected to a first OTG host device, the first OTG host device identifies the device, which is connected to the upstream port connector, as a USB device through the first USB OTG controller and the first USB device controller, and the device, which is connected to the upstream port connector, identifies the first OTG host device, which is connected to the first downstream port connector, as a USB device through the first USB OTG controller and the first USB device controller, wherein the multi-host supported USB hub further comprises:
a second USB device controller, which is coupled to the second downstream port for simulating a USB device; and
a second USB OTG controller coupled to the second downstream port connector and the second USB device controller,
wherein when the second downstream port connector is connected to a second OTG host device, the second OTG host device identifies the device, which is connected to the upstream port connector, as a USB device through the second USB OTG controller and the second USB device controller, and the device, which is connected to the upstream port connector, identifies the second OTG host device, which is connected to the second downstream port connector, as a USB device through the second USB OTG controller and the second USB device controller,
wherein a device connected on the second downstream port connector or the first downstream port connector can access other USB device attached on the other USB port.

11. The automobile head unit according to claim 10, wherein the multi-host supported USB hub further comprises:
a bus matrix comprising a first input-output port, a second input-output port, a third input-output port, a fourth input-output port, a fifth input-output port and a sixth input-output port, wherein the first input-output port is coupled to the upstream port, the second input-output port is coupled to the first downstream port, the third input-output port is coupled to the second downstream port, the fourth input-output port is coupled to the upstream port connector, the fifth input-output port is coupled to the first USB device controller, and the sixth input-output port is coupled to the second downstream port connector,
wherein connection relationships from the first input-output port, the second input-output port and the third input-output port of the bus matrix to the fourth input-output port, the fifth input-output port and the sixth input-output port of the bus matrix, respectively, are controlled according to a request of a device, coupled to the first downstream port connector or the second downstream port connector, to decide the upstream port connector, the first downstream port connector or the second downstream port connector to be coupled to the upstream port of the USB hub circuit.

12. The automobile head unit according to claim 11, wherein the multi-host supported USB hub further comprises:
   a first multiplexer comprising a first port, a second port and a third port, wherein the first port of the first multiplexer is coupled to the first downstream port connector, the second port of the first multiplexer is coupled to the first downstream port, and the third port of the first multiplexer is coupled to the first USB OTG controller,
   wherein the first multiplexer is used to decide that the first port is electrically connected to the second port or the third port.

13. The automobile head unit according to claim 12, wherein the multi-host supported USB hub further comprises:
   a second multiplexer comprising a first port, a second port and a third port, wherein the first port of the second multiplexer is coupled to the second downstream port connector, the second port of the second multiplexer is coupled to the second downstream port, and the third port of the second multiplexer is coupled to the second USB OTG controller,
   wherein the second multiplexer is used to decide that the first port is electrically connected to the second port or the third port.

* * * * *